United States Patent
Kim et al.

(10) Patent No.: US 9,862,784 B2
(45) Date of Patent: Jan. 9, 2018

(54) APPARATUS AND METHOD FOR PREPARING POLYBUTENE HAVING VARIOUS MOLECULAR WEIGHTS

(71) Applicant: DAELIM INDUSTRIAL CO., LTD., Seoul (KR)

(72) Inventors: Myeong Seok Kim, Daejeon (KR); Min Sup Park, Daejeon (KR); Hyung Jae Seo, Daejeon (KR); Se Hyun Lee, Daejeon (KR)

(73) Assignee: DAELIM INDUSTRIAL CO., LTD., Seoul (KR)

( * ) Notice: Subject to any disclaimer, the term of this patent is extended or adjusted under 35 U.S.C. 154(b) by 120 days.

(21) Appl. No.: 14/895,549

(22) PCT Filed: Jun. 3, 2014

(86) PCT No.: PCT/KR2014/004938
§ 371 (c)(1),
(2) Date: Dec. 3, 2015

(87) PCT Pub. No.: WO2014/196788
PCT Pub. Date: Dec. 11, 2014

(65) Prior Publication Data
US 2016/0130377 A1    May 12, 2016

(30) Foreign Application Priority Data

Jun. 5, 2013 (KR) .................. 10-2013-0064434
Feb. 20, 2014 (KR) .................. 10-2014-0019613

(51) Int. Cl.
C08F 110/10   (2006.01)
B01J 19/24    (2006.01)
C08F 4/14     (2006.01)

(52) U.S. Cl.
CPC ............. *C08F 110/10* (2013.01); *B01J 19/24* (2013.01); *B01J 2219/00168* (2013.01); *B01J 2219/24* (2013.01)

(58) Field of Classification Search
CPC .................. C08F 110/10; B01J 19/24
(Continued)

(56) References Cited

U.S. PATENT DOCUMENTS

| 4,605,808 A | 8/1986 | Samson |
| 5,068,490 A | 11/1991 | Eaton |

(Continued)

FOREIGN PATENT DOCUMENTS

| CN | 1304418 A | 7/2011 |
| CN | 102603950 A | 7/2012 |

(Continued)

OTHER PUBLICATIONS

PCT/ISA/237 of counterpart International application PCT/KR2014/004938 dated Dec. 17, 2015 and English Translation hereof.

(Continued)

*Primary Examiner* — Fred M Teskin
(74) *Attorney, Agent, or Firm* — Nath, Goldberg & Meyer; Joshua B. Goldberg; Tanya E. Harkins

(57) ABSTRACT

Disclosed are an apparatus and method for preparing polybutene having various molecular weights by using complex catalysts of different molar ratios. The apparatus for preparing polybutene having various molecular weights, comprises: a complex catalyst preparing device for preparing a high-activity complex catalyst and a low-activity complex catalyst to form highly reactive polybutene through polymerization; a high-molar ratio complex catalyst system for controlling the storage and supply of the high-activity complex catalyst; a low-molar ratio complex catalyst system for (Continued)

controlling the storage and supply of the low-activity complex catalyst; and a reactor to which reaction raw materials including the high-activity complex catalyst, the low-activity complex catalyst, and isobutene are supplied to be polymerized into highly reactive polybutene.

12 Claims, 1 Drawing Sheet

(58) Field of Classification Search
USPC .................................... 526/209, 348.7, 919
See application file for complete search history.

(56) References Cited

U.S. PATENT DOCUMENTS

| | | | |
|---|---|---|---|
| 5,191,044 A | 3/1993 | Rath et al. | |
| 5,408,018 A | 4/1995 | Rath | |
| 5,910,550 A | 6/1999 | Rath | |
| 5,962,604 A | 10/1999 | Rath | |
| 6,300,444 B1 | 10/2001 | Tokumoto et al. | |
| 7,485,764 B2 * | 2/2009 | Rath | C08F 10/10 |
| | | | 526/209 |
| 7,893,176 B2 * | 2/2011 | Shaffer | C08F 210/12 |
| | | | 526/135 |
| 2006/0195000 A1 * | 8/2006 | Yun | C08F 10/08 |
| | | | 585/520 |
| 2008/0249268 A1 | 10/2008 | Rath et al. | |
| 2012/0316304 A1 | 12/2012 | Shaikh et al. | |

FOREIGN PATENT DOCUMENTS

| | | |
|---|---|---|
| KR | 10-0140716 B | 8/1989 |
| KR | 10-2002-0037083 A | 5/2002 |
| KR | 10-2010-0069011 A | 12/2011 |
| WO | 99/64482 A1 | 12/1999 |
| WO | 02/38630 A1 | 5/2002 |
| WO | 2005/077522 A1 | 8/2005 |
| WO | 2011/073380 A1 | 6/2011 |

OTHER PUBLICATIONS

European Search Report dated May 2, 2017 issued in corresponding European Application No. 14807017.0.
European Search Report dated Jul. 14, 2017 issued in corresponding European Application No. 17161424.1.

* cited by examiner

APPARATUS AND METHOD FOR PREPARING POLYBUTENE HAVING VARIOUS MOLECULAR WEIGHTS

TECHNICAL FIELD

The present invention relates to an apparatus and method for preparing polybutene having various molecular weights, and more particularly to an apparatus and method for preparing polybutene having various molecular weights using complex catalysts having different molar ratios.

BACKGROUND ART

In general, polybutene is obtained by polymerizing an olefin component having 4 carbon atoms (C4) derived during a naphtha cracking process using a Friedel-Crafts catalyst, and has a number average molecular weight ($M_n$) of approximately 300 to 5,000. A residuum remaining after 1,3-butadiene is extracted from C4 raw materials is referred to as C4 raffinate-1, which includes paraffins such as isobutane, and normal butane, and olefins such as 1-butene, 2-butene, isobutene, etc. Among these components, the content of isobutene is in a range of approximately 30 to 50% by weight. The C4 raffinate-1 is generally used to prepare an octane booster such as methyl-t-butyl ether (MTBE) or polybutene. In this case, since isobutene has the highest reactivity among the olefin components of the C4 raffinate-1, the resulting polybutene is mainly composed of isobutene units. In addition, polybutene is often prepared from a butane-butene (B-B) fraction or high-purity isobutene, which is a C4 mixture derived during a petroleum refining process.

Viscosity of polybutene increases with increase in molecular weight. For example, polybutene has a viscosity of approximately 4 to 40,000 centistokes (cSt) at 100° C. In addition, polybutene is thermally cracked at a temperature of 300° C. or higher without leaving remnants behind, and is highly soluble in a lubricant or a fuel since the polybutene has a branched alkyl structure. Therefore, the polybutene is often used as an anti-scuff agent or a viscosity index improver when added to car engine oil, and also used as a detergent when mixed with a fuel in internal combustion engines for automobiles.

In the prior art, since polybutene was generally used in pressure-sensitive adhesives, adhesives, and insulating oils, products having high reactivity have not been preferred. In recent years, however, demand for polybutene, which is highly reactive since polar groups are incorporated to polybutene, has steadily increased with increasing use as fuel detergents or lubricant additives. Therefore, a highly reactive polybutene to which polar groups may be incorporated due to reactivity has been widely used for fuel detergents or lubricant additives. A polyisobutenyl succinic anhydride (PIBSA) prepared by reaction of a maleic anhydride with a double bond at the end of a highly reactive polybutene by means of heating has been widely used in products which may be obtained by incorporating polar groups thereto. In this case, PIBSA is used as an intermediate when most lubricant additives or fuel detergents are prepared. For example, when double bonds in polybutene used to prepare PIBSA are positioned at the end of polybutene, PIBSA is obtained with high yield. On the other hand, when double bonds are positioned inside polybutene, and especially when double bonds are increasingly substituted with alkyl groups, the yield of PIBSA decreases due to low reactivity caused by steric hindrance.

Forming a double bond at an end of a molecule and terminating polymerization of a polymer means production of compounds which do not follow a general theory of chemical kinetics. The use of a complex catalyst in which a catalyst and a cocatalyst are mixed is most effective in preparing highly reactive polybutene which is difficult to produce in this way. However, such a complex catalyst has difficulties in operation of plants, for example, installing a tank for preparing a complex catalyst and producing various products having different molecular weights, but there are no patents proposing solutions and countermeasures to the difficulties.

Prior to use of highly reactive polybutene, PIBSA was prepared from typical polybutene, that is, non-reactive polybutene. One method of enhancing reactivity of non-reactive polybutene includes chlorinating polybutene with chlorine gas (a chlorination reaction), and then reacting the chlorinated polybutene with a maleic anhydride to prepare PIBSA, thereby finishing final products. In this case, however, high costs are required to prevent corrosion of a reactor, and a large amount of a basic solution should also be used to neutralize unreacted chlorine gases, which are undesirable in economic and environmental aspects. Further, when PIBSA having an increased content of chlorine is used as a fuel additive and the like, internal combustion engines such as car engines may suffer corrosion, and chlorine may be discharged as an exhaust gas. Therefore, such problems have been addressed thorough a method of preparing a lubricant additive and a fuel detergent using a highly reactive polybutene.

Highly reactive polybutene has an advantage as it has a higher content of vinylidene. The reason will be explained below based on techniques generally known in the art. Highly reactive polybutene is subjected to an Ene reaction (also known as an Alder-ene reaction) to react with maleic anhydride at approximately 230° C. PIBSA prepared by such a reaction is allowed to react with an alkylamine to prepare polyisobutenyl succinic imide (PIBSI), and a diluent having a high boiling point is mixed with the PIBSI to prepare a fuel detergent and a lubricant additive. The yield of PIBSA varies according to the content of vinylidene in the highly reactive polybutene. As the content of vinylidene increases, the PIBSA has superior qualities, and the yield of PIBSA also increases. Here, the higher yield of PIBSA means the higher yield of PIBSI, indicating that an active ingredient serving as a detergent is present in a high content. Therefore, it is revealed that it is important to prepare a highly reactive polybutene having a high content of vinylidene.

Evolution of non-reactive polybutene used in such a lubricant additive or fuel detergent into highly reactive polybutene is a process which has a process improvement in which one reaction step is reduced and is environmentally friendly since it is possible to remove toxic chlorine ($Cl_2$) gas. Therefore, research on preparation of highly reactive polybutene, which has a vinylidene content of at least 70%, more preferably at least 85% but does not include chlorine causing corrosion of devices, has been conducted to enhance reactivity of polybutene. Boron trifluoride ($BF_3$), which is used to yield a highly reactive polybutene having a relatively higher content of vinylidene than other Lewis acids, is generally used as a Friedel-Crafts catalyst to prepare the highly reactive polybutene. U.S. Pat. Nos. 4,605,808, 5,068, 490, 5,191,044, 5,408,018, 5,962,604, and 6,300,444 disclose a method of preparing highly reactive polybutene, wherein the highly reactive polybutene has a vinylidene content of at least 70%, more preferably at least 80% when boron trifluoride or a complex thereof is used together with a cocatalyst such as water, ether, alcohol, etc.

Referring to the patent documents, the molecular weights of polymer products are very closely related with the catalytic activity. That is, when a complex catalyst having a high catalytic activity and a low cocatalyst/main catalyst molar ratio is used, products having high molecular weights are produced. On the other hand, when the molar ratio of the complex catalyst gradually increases, catalytic activity may be lowered, leading to production of products having low molecular weights. In addition, the content of vinylidene indirectly implies that a cocatalyst such as alcohol and ether, and a complex catalyst with degraded catalytic activity are used to enhance reaction selectivity of isobutene, thereby preparing a highly reactive polybutene having a high content of vinylidene.

Registered U.S. Pat. No. 5,068,490 discloses a method of preparing polybutene having a vinylidene content of at least 80% using a complex of boron trifluoride and ether containing at least one tertiary alkyl group as a catalyst. Such a method has an advantage in that a low level of isomerization reaction occurs even when long contact times are maintained. Meanwhile, referring to the embodiments of Registered U.S. Pat. No. 5,068,490, the best results are realized when isopropyl t-butyl ether having both a secondary alkyl group and a tertiary alkyl group is used, but isopropyl t-butyl ether has a drawback in that it is very expensive, and isopropyl t-butyl ether must be personally manufactured as commercial sources are unavailable. Registered U.S. Pat. Nos. 5,408,018 and 5,962,604 disclose a method of preparing polybutene, which has a vinylidene content of at least 80% and a narrow molecular weight distribution as well, using a complex of secondary alcohol and boron trifluoride as a catalyst. However, the method has many limitations on reaction conditions in which the contact is maintained at a temperature of −10° C. or less for a short period of time, and has a drawback in that a high-purity isobutene raw material should be used to increase the content of vinylidene. Registered U.S. Pat. No. 6,300,444 discloses a method of preparing polybutene using a catalyst (boron trifluoride) and a cocatalyst (ether, alcohol and/or water) in a specified molar ratio. Registered U.S. Pat. No. 6,300,444 is characterized in that a catalyst, a cocatalyst, and a reaction raw material are added together to a reactor to prepare a highly reactive polybutene without forming a complex of the catalyst and the cocatalyst in advance, and a vacuum pump is used to reduce a content of fluorine in the product, but has drawbacks in that it is difficult to obtain a highly reactive polybutene having a high vinylidene content since the catalyst and the cocatalyst cannot be mixed to form a stable complex, and high costs are required since a vacuum pump is used to reduce the content of fluorine in the product.

The highly reactive polybutene is important for vinylidene content (terminal double bond content). Thus, complex catalysts optimized for respective products having different molecular weights are required to prepare highly reactive polybutene having a high vinylidene content. For example, methods of preparing 6 complex catalysts having different molar ratios are required to prepare 6 types of highly reactive polybutenes having different molecular weights. A production plan suitable for market demands should be designed, and thus complex catalysts suitable for use in each of the products having different molecular weights should be prepared to effectively produce the products in consideration of manufacturing costs. That is, complex catalysts should be prepared to match output, and a cycle of preparing a complex catalyst should increase with increase in the number of products having different molecular weights. However, since catalysts should be separately prepared and added to polybutenes having different molecular weights as known in the prior art, manufacturing costs may increase due to increase in labor costs and installations costs for tanks used to prepare the respective catalysts, and the content of vinylidene in the polybutenes is also low. In addition, when only one catalyst is used to prepare polybutenes having different molecular weights, the polybutenes are prepared so that the content of vinylidene in the polybutenes is lower by up to approximately 10%. The content of vinylidene of 10% differs by approximately 6 to 8% due to a difference in reaction yield with a maleic anhydride to prepare PIBSA, and thus corresponds to approximately 10% of PIBSA with a total reaction yield of 70%. As a result, end users will purchase products having a content of vinylidene increased by 10%, indicating that end users will purchase products having a value increased by 10%.

Also, since a main catalyst and a cocatalyst are mixed in exact molar ratios to prepare a complex catalyst, this process may be cumbersome due to many regulations which have to be obeyed during a manufacturing process, for example, injecting the main catalyst and the cocatalyst in fixed amounts, maintaining a proper temperature while a complex is prepared, maintaining a proper injection rate of catalysts to prevent deformation of the catalysts caused by heat occurring during preparation of the complex, etc. Further, when operators hired to run a plant work long hours, an increase in manufacturing costs is also caused, which leads to increase in fixed costs. Therefore, there is an urgent demand for improvement of systems for preparing and feeding a complex catalyst.

BRIEF SUMMARY

Therefore, the present invention has been made in view of the above problems, and it is an object of the present invention to provide an apparatus and method for preparing polybutene having various molecular weights using a high-activity complex catalyst having a low cocatalyst/main catalyst molar ratio and a low-activity complex catalyst having a high cocatalyst/main catalyst molar ratio, wherein the polybutene has a vinylidene content of 70% or more.

It is another object of the present invention to provide a method of improving a conventional inefficient system for preparing a complex catalyst, which includes mixing the high-activity complex catalyst and the low-activity complex catalyst in proper ratios in a tube, prior to supplying the high-activity complex catalyst and the low-activity complex catalyst to a reactor, to continuously produce products having various molecular weights.

It is still another object of the present invention to provide an apparatus and method for preparing polybutene having an easily controllable molecular weight, which is able to prepare polybutene having various molecular weights using an auxiliary cocatalyst and a complex catalyst including a cocatalyst and a main catalyst in proper molar ratios, wherein the polybutene has a vinylidene content of 70% or more.

It is yet another object of the present invention to provide an apparatus and method for preparing polybutene having an easily controllable molecular weight, which is able to improve a conventional inefficient system for preparing a complex catalyst, which includes mixing an auxiliary cocatalyst with the complex catalyst to control catalytic activity of the cocatalyst/main catalyst complex catalyst so as to increase the content of vinylidene and simultaneously to continuously produce products having various molecular weights.

DETAILED DESCRIPTION

Figure 1:
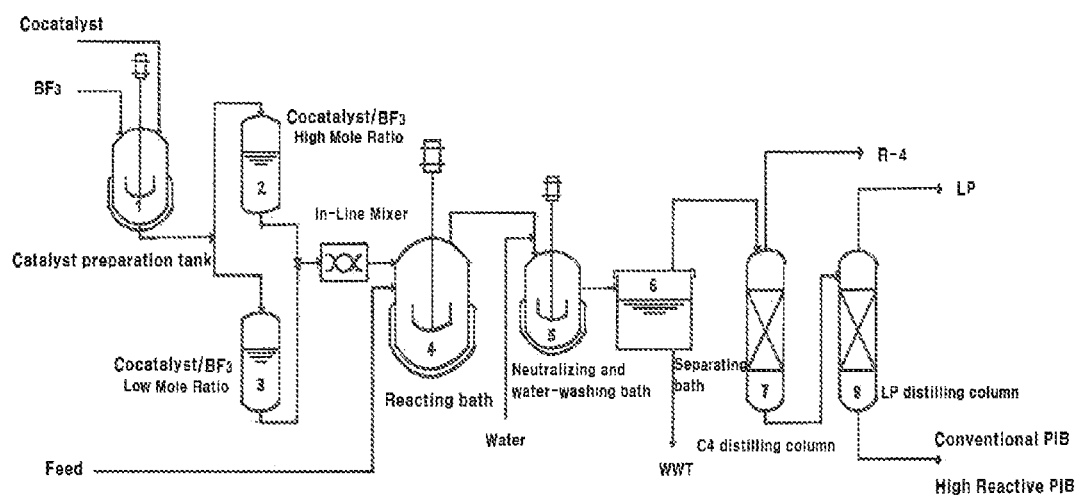
FIG. 1 is a schematic diagram showing an apparatus for preparing polybutene having various molecular weights according to one embodiment of the present subject matter.

According to an aspect of the present invention, the above and other objects can be accomplished by the provision of an apparatus for preparing polybutene having various molecular weights, which includes a complex catalyst preparation device for preparing a high-activity complex catalyst and low-activity complex catalyst to form highly reactive polybutene through polymerization, a high molar ratio complex catalyst system (hereinafter referred to as a "high-molar ratio complex catalyst system") for controlling the storage and supply of the high-activity complex catalyst, a low molar ratio complex catalyst system (hereinafter referred to as a "low-molar ratio complex catalyst system") for controlling the storage and supply of the low-activity complex catalyst, and a reactor to which the high-activity complex catalyst, the low-activity complex catalyst, and a reaction raw material including isobutene are supplied to polymerize isobutene into a highly reactive polybutene.

According to another aspect of the present invention, there is provided an apparatus for preparing polybutene having an easily controllable molecular weight, which includes a complex catalyst preparation device for preparing a complex catalyst including an alcohol compound as a cocatalyst and boron trifluoride as a main catalyst, a complex catalyst supply device for controlling the supply of the complex catalyst transferred from the complex catalyst preparation device, a raw material injection line for supplying a reaction raw material, an auxiliary cocatalyst injection line for incorporating an ether compound as an auxiliary cocatalyst to the complex catalyst or the reaction raw material, and a reactor for reacting the reaction raw material supplied through the raw material injection line with a mixture of the auxiliary cocatalyst and the complex catalyst or reacting the complex catalyst supplied from the complex catalyst supply device with a mixture of the auxiliary cocatalyst and the reaction raw material to polymerize isobutene into polybutene.

Advantageous Effects

The apparatus and method for preparing polybutene having various molecular weights according to embodiments of the present invention can be useful in reducing inefficiency in preparing a complex catalyst using a high-activity complex catalyst having a low molar ratio and a low-activity complex catalyst having a high molar ratio so as to continuously polymerize and produce all grades of highly reactive polybutene having a high content of vinylidene and different molecular weights.

In addition, the highly reactive polybutene should be efficiently produced in consideration of high production costs since the highly reactive polybutene is polymerized and produced in consideration of the importance of vinylidene content (terminal double bond content). The content of vinylidene in the highly reactive polybutene produced with the optimum complex catalyst according to one embodiment differs by up to approximately 10% from the content of vinylidene in the highly reactive polybutene produced with other complex catalysts which are not optimal. The content of vinylidene of 10% differs by approximately 6 to 8% due to a difference in yield in reaction with a maleic anhydride to prepare PIBSA, and thus corresponds to approximately 10% of PIBSA with a total reaction yield of 70%. As a result, end users will purchase products having a content of vinylidene increased by 10%, indicating that end users will purchase products having a value increased by 10%. Therefore, a method of injecting an improved complex catalyst according to one embodiment of the present invention can allow manufacturers of highly reactive polybutene products to hold an advantageous position in which consumer value is maximized in the market and gain an opportunity to increase the prices of products.

Further, the apparatus and method for preparing polybutene having an easily controllable molecular weight according to one embodiment of the present invention can be useful in improving a conventional inefficient system for preparing a complex catalyst, and thus mixing an auxiliary cocatalyst with a cocatalyst/main catalyst complex catalyst to adjust catalytic activity of the complex catalyst and arranging the auxiliary cocatalyst close to the cocatalyst/main catalyst complex catalyst, thereby continuously polymerizing and producing a highly reactive polybutene having a high vinylidene content of 70% or more and various molecular weights. Therefore, the value to consumers using the highly reactive polybutene can be maximized, and manufacturers can produce high-quality products while reducing manufacturing costs, which makes it possible to hold an advantageous position in the market and simultaneously gain an opportunity to increase the prices of products.

BEST MODE

Hereinafter, the present invention will be described in detail with reference to the accompanying drawings.

As shown in FIG. 1, an apparatus for preparing polybutene having various molecular weights according to one embodiment (a first embodiment) of the present invention includes (a) a complex catalyst preparation device 1, (b) a high-molar ratio complex catalyst system 2, (c) a low-molar ratio complex catalyst system 3, and (d) a reactor 4, and further includes an in-line mixer, a neutralization/washing tank 5, a separation tank 6, a C4 distillation column 7, and a light polymer (LP) distillation column 8, when necessary.

The (a) complex catalyst preparation device 1 (hereinafter optionally referred to as a "complex catalyst system") serves to feed a cocatalyst and a main catalyst to prepare a high-activity complex catalyst and a low-activity complex catalyst so as to form highly reactive polybutene through polymerization. Here, the high-activity complex catalyst having a low cocatalyst/main catalyst molar ratio is supplied to the high-molar ratio complex catalyst system 2, and the low-activity complex catalyst having a high cocatalyst/main catalyst molar ratio is supplied to the low-molar ratio complex catalyst system 3.

The catalyst supplied through the complex catalyst preparation device 1 includes a main catalyst, a cocatalyst including water or an alcohol compound, and an auxiliary cocatalyst including an alkyl ether. A typical Friedel-Crafts catalyst (i.e., a Lewis acid) may be used as the main catalyst without limitation. For example, boron trifluoride, boron trichloride, aluminum trichloride, and zinc chloride may be used as the main catalyst, but use of the boron trifluoride having excellent activity to induce production of terminal vinylidene and favorable for commercial purposes is most preferred. The boron trifluoride is fed so that the content of the boron trifluoride is in a range of 0.1 to 1.0 parts by weight, based on 100 parts by weight of isobutene. The cocatalyst essential for reactions serves as a proton (H$^+$) donor for reaction initiation, and water or an alcohol compound having 1 to 4 carbon atoms may be used without limitation. Examples of the alcohol compound may include methanol, ethanol, propanol, isopropyl alcohol (isopropanol), butanol, isobutanol, etc. In addition, the auxiliary cocatalyst serves to stabilize protons produced by the cocatalyst and to adjust reactivity, and an alkyl ether ($R_1$—O—$R_2$) having 2 to 10 carbon atoms may be used without limitation. Examples of the alkyl ether may include dimethyl ether, diethyl ether, dipropyl ether, isopropyl sec-butyl ether, sec-butyl ether, isoamyl ether, isopropyl isoamyl ether, sec-butyl isoamyl ether, etc.

The molar ratio of the high-activity complex catalyst having a low cocatalyst/main catalyst molar ratio is greater than or equal to 1 and less than 1.5, preferably in a range of 1.1 to 1.4, and the molar ratio of the low-activity complex catalyst having a high cocatalyst/main catalyst molar ratio is in a range of 1.5 to 3, preferably 1.6 to 2.5. Since the complex catalyst may be deformed when the molar ratio is excessively low, the molar ratio should be greater than or equal to 1. On the other hand, when the complex catalyst having an excessively high molar ratio is mixed with the complex catalyst having a low molar ratio, a large amount of the complex catalyst having a low molar ratio may be consumed, which results in inefficient operations. Accordingly, the molar ratio should be less than or equal to 3.

The (b) high-molar ratio complex catalyst system 2 serves to control the storage and supply of the high-activity complex catalyst flowing out of a lower portion of the complex catalyst preparation device 1, and thus provides catalysts having various low molar ratios flowing out of the complex catalyst preparation device 1, that is, catalysts having molar ratios optimized for products having different molecular weights.

The (c) low-molar ratio complex catalyst system 3 serves to control the storage and supply of the low-activity complex catalyst flowing out of a lower portion of the complex catalyst preparation device 1, and thus provides catalysts having various high molar ratios flowing out of the complex catalyst preparation device 1, that is, catalysts having molar ratios optimized for products having different molecular weights.

The (d) reactor 4 is supplied with the high-activity complex catalyst, the low-activity complex catalyst, and a reaction raw material including isobutene to polymerize isobutene into highly reactive polybutene (a cationic polymerization reaction accompanied by generation of heat), and adjusts a reaction temperature, catalytic strength and an isobutene content after reaction so as to determine molecular weights and vinylidene contents of products. In this case, a reaction product formed by polymerization is discharged from an upper portion of the reactor 4.

The highly reactive polybutene has a vinylidene content at an end of a molecule of 70% or more, preferably 71 to 99%, more preferably 75 to 95%, and most preferably 80 to 95%, and the highly reactive polybutene generally has a number average molecular weight ($M_n$) of 300 to 5,000. The reaction raw material used to prepare the highly reactive polybutene includes 10% by weight or more, preferably 25 to 60% by weight of isobutene. For example, the reaction raw material is C4 raffinate-1 remaining after 1,3-butadiene is extracted from a mixture of hydrocarbons having 4 carbon atoms derived during a naphtha cracking process or a petroleum refining process. In addition, pure isobutene may be diluted with alkanes prior to use. The concentration of isobutene is in a range of 25 to 60% by weight to properly polymerize products.

The in-line mixer that may be further included when necessary serves to mix the high-activity complex catalyst flowing out of the high-molar ratio complex catalyst system 2 and the low-activity complex catalyst flowing out of the low-molar ratio complex catalyst system 3 while continuously stirring, and transfer a mixture of the complex catalysts to the reactor 4. The neutralization/washing tank 5 serves to add polymerization process water including water and sodium hydroxide, which is fed through a transfer line between the reactor 4 and the neutralization/washing tank 5, to a reaction product discharged from the reactor 4 to remove catalyst components from the reaction product and neutralize the reaction product, and discharge the neutralized reaction product into the separation tank 6 via a lateral surface of the neutralization/washing tank 5. The separation tank 6 serves to separate the reaction product into organic compounds and a water layer using the principle of phase separation into water and oil, discharge a mixture of the water layer, which includes the catalyst components removed from the neutralization/washing tank 5, from a lower portion of the separation tank 6, and discharge the organic compounds, which remain after the catalyst is removed from the reaction product, from an upper portion of the separation tank 6. The C4 distillation column 7 serves to distill unreacted C4 in the organic compounds fed from the separation tank 6 and discharge and collect the unreacted C4 from an upper portion of the C4 distillation column 7. In this case, the residual organic compounds are discharged from a lower portion of the C4 distillation column 7, and then fed to the LP distillation column 8. The LP distillation column 8 serves to distill a light polymer (LP) in the residual organic compounds flowing out of the C4 distillation column 7 and to discharge and collect the LP from an upper portion of the LP distillation column 8. In this case, the highly reactive polybutene is released through a lower portion of the LP distillation column 8, and then stored in a product storage tank.

Next, the method of preparing polybutene having various molecular weights according to one embodiment of the present invention will be described with reference to FIG. 1. FIG. 1, as will be recited in the detailed description of the preparation method below, illustrates one method of preparing polybutene having various molecular weights, but is not intended to encompass all embodiments of the present invention.

The method of preparing polybutene having various molecular weights according to one embodiment of the present invention includes preparing a high-activity complex catalyst and a low-activity complex catalyst to form highly reactive polybutene through polymerization, controlling the storage and supply of the high-activity complex catalyst and the low-activity complex catalyst, and supplying the high-activity complex catalyst, the low-activity complex catalyst, and a reaction raw material including isobutene to polymerize isobutene into highly reactive polybutene.

The highly reactive polybutene obtained by the method of preparing polybutene having various molecular weights will be described in detail, as follows. When an amount of the cocatalyst weighed at the complex catalyst preparation device 1 is added, the main catalyst such as boron trifluoride is added in a calculated amount over approximately 4 hours while maintaining a temperature condition of −10° C. and simultaneously paying attention to heat generation, thereby preparing a high-activity complex catalyst having a low cocatalyst/main catalyst molar ratio and a low-activity complex catalyst having a high cocatalyst/main catalyst molar ratio. The prepared high-activity complex catalyst and low-activity complex catalyst are supplied to the high-molar ratio complex catalyst system 2 and the low-molar ratio complex catalyst system 3, respectively, to control the storage and supply of the high-activity complex catalyst and the low-activity complex catalyst. Next, the high-activity complex catalyst, the low-activity complex catalyst, and a reaction raw material (e.g., C4 raffinate-1) including isobutene are supplied to the reactor 4 to initiate polymerization reaction for preparing a highly reactive polybutene.

The polymerization of the highly reactive polybutene may be performed under typical reaction conditions, for example, generally performed at a temperature of −40 to 20° C., preferably −35 to 10° C., and more preferably −30 to 5° C. and a pressure of 3 kg/cm$^2$ or more, preferably 3.5 to 10 kg/cm$^2$ for 5 to 100 minutes, preferably 10 to 45 minutes to maintain the reaction raw material in a liquid state. Meanwhile, since the highly reactive polybutene is obtained by the method of preparing polybutene having an easily controllable molecular weight according to one embodiment of the present invention, a conversion rate of isobutene may be greater than or equal to 70%, preferably in a range of 80 to 95% to maintain terminal vinylidene at a high level.

A process of preparing the highly reactive polybutene that may be further included when necessary will be described as follows. The high-activity complex catalyst and the low-activity complex catalyst supplied respectively to the high-molar ratio complex catalyst system 2 and the low-molar ratio complex catalyst system 3 are mixed in the in-line mixer. At the neutralization/washing tank 5, polymerization process water including water and sodium hydroxide, which is fed through a transfer line between the reactor 4 and the neutralization/washing tank 5, is added to the reaction product discharged from the reactor 4 to remove catalyst components from the reaction product and neutralize the reaction product. At the separation tank 6 to which the reaction product from which the catalyst components are removed is fed, the reaction product is separated into organic compounds and a water layer using the principle of phase separation into water and oil. A mixture of the water layer including catalyst components removed from the neutralization/washing tank 5 is discharged, and the organic compounds remaining after the catalyst is removed from the reaction product is supplied to the C4 distillation column 7. At the C4 distillation column 7, unreacted C4 among the organic compounds fed from the separation tank 6 is distilled and collected, and the residual organic compounds are supplied to the LP distillation column 8. At the LP distillation column 8, the LP among the residual organic compounds flowing out of the C4 distillation column 7 is distilled and collected, and the highly reactive polybutene is stored in the product storage tank.

Figure 2:
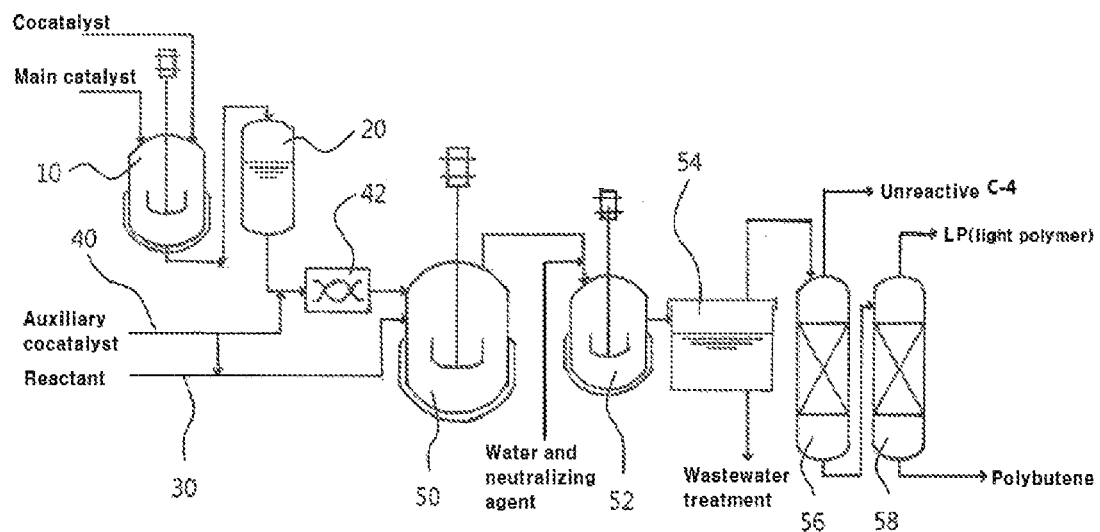
FIG. 2 is a schematic diagram showing an apparatus for preparing polybutene having an easily controllable molecular weight according to another embodiment of the present subject matter.

FIG. 2 is a schematic diagram showing an apparatus for preparing polybutene having an easily controllable molecular weight according to another embodiment of the present invention. Here, FIG. 2 illustrates one apparatus for preparing polybutene having an easily controllable molecular weight, but is not intended to encompass all embodiments of the present invention. As shown in FIG. 2, the apparatus for preparing polybutene having an easily controllable molecular weight according to another embodiment (a second embodiment) of the present invention includes a complex catalyst preparation device 10, a complex catalyst supply device 20, a raw material injection line 30, an auxiliary cocatalyst injection line 40, and a reactor 50, and further includes an in-line mixer 42, a neutralization/washing tank 52, a separation tank 54, a C4 distillation column 56, and an LP distillation column 58, when necessary.

The complex catalyst preparation device 10 serves to feed a cocatalyst and a main catalyst to prepare a complex catalyst including an alcohol compound as the cocatalyst and boron trifluoride as the main catalyst. Here, the prepared complex catalyst is transferred to the complex catalyst supply device 20. When necessary, a typical Friedel-Crafts catalyst (i.e., Lewis acids such as boron trichloride, aluminum trichloride, and zinc chloride) may be used as the main catalyst, but use of the boron trifluoride having an excellent activity to induce production of terminal vinylidene and favorable for commercial purposes is most preferred. As the main catalyst, the boron trifluoride is present in an amount of 0.02 to 1 part by weight, based on 100 parts by weight of the isobutene. The cocatalyst serves as a proton (H$^+$) donor for reaction initiation, and an alcohol compound having 1 to 4 carbon atoms may be used without limitation. Examples of the alcohol compound may include methanol, ethanol, propanol, isopropyl alcohol (isopropanol), butanol, and isobutanol. The molar ratio of the cocatalyst and the main catalyst constituting the complex catalyst is in a range of 1 to 2, preferably 1 to 1.7, and more preferably 1 to 1.4. Since an auxiliary cocatalyst, as will be described below, adjusts catalytic strength so that isobutene is mainly used in a cationic polymerization reaction and impart steric hindrance to increase a content of vinylidene, the low molar ratio close to 1 is most preferred. When the molar ratio of the cocatalyst and the main catalyst is less than 1, the products may be spoiled due to high catalytic activity. On the other hand, when the molar ratio of the cocatalyst and the main catalyst is greater than 2, production efficiency may be lowered due to very low catalytic activity.

The complex catalyst supply device 20 serves to adjust the supply of the cocatalyst/main catalyst complex catalyst transferred from the complex catalyst preparation device 10, and transfers a highly active cocatalyst/main catalyst complex catalyst to the reactor 50. Next, the raw material injection line 30 serves to supply a reaction raw material to the reactor 50, and feeds a mixture, in which the auxiliary cocatalyst and the reaction raw material are mixed, to the reactor 50 when an auxiliary cocatalyst as will be described below is incorporated to the raw material injection line 30.

The auxiliary cocatalyst injection line 40 serves to supply the auxiliary cocatalyst. Here, an ether compound as the auxiliary cocatalyst is incorporated to the complex catalyst, or incorporated to the reaction raw material. That is, as shown in FIG. 1, the auxiliary cocatalyst is (i) fed through a line between the complex catalyst supply device 20 and the reactor 50 via the auxiliary cocatalyst injection line 40 and incorporated to the highly active cocatalyst/main catalyst complex catalyst supplied from the complex catalyst supply device 20, or (ii) incorporated to the reaction raw material through a line coupled to the raw material injection line 30 at one position of the auxiliary cocatalyst injection line 40.

The auxiliary cocatalyst serves to stabilize protons produced by the cocatalyst adjust reactivity of the complex catalyst, and impart steric hindrance. Here, an ether compound having 2 to 10 carbon atoms may be used without limitation. The ether compound may include dimethyl ether, diethyl ether, dipropyl ether, diisopropyl ether, isopropyl sec-butyl ether, sec-butyl ether, isoamyl ether, isopropyl isoamyl ether, and sec-butyl isoamyl ether. Here, use of diisopropyl ether is most preferred. Meanwhile, the molar ratio of the cocatalyst and auxiliary cocatalyst and the main catalyst is in a range of 1.1 to 3, preferably 1.1 to 2.5, and more preferably 1.2 to 2. When the molar ratio of the cocatalyst and auxiliary cocatalyst and the main catalyst is less than 1.1, produce quality may be degraded (the content of vinylidene may be low) due to a very low catalytic activity. On the other hand, when the molar ratio is greater than 3, production efficiency may be lowered due to very high catalytic activity. An amount of the added auxiliary cocatalyst may vary according to the viscosity and molecular weight of polybutene to be prepared. In this case, a relatively small amount of the auxiliary cocatalyst may be used when polybutene having a high viscosity and a high molecular weight is prepared, whereas a relatively large amount of the auxiliary cocatalyst may be used when polybutene having a low viscosity and a low molecular weight is prepared.

Next, the reactor 50 serves to react the cocatalyst/main catalyst complex catalyst, the auxiliary cocatalyst and the reaction raw material supplied from the complex catalyst supply device 20 and the raw material injection line 30. That is, the reactor 50 serves to (i) react the reaction raw material supplied from the raw material injection line 30 with a mixture of the auxiliary cocatalyst and the complex catalyst or ii) react the complex catalyst supplied from the complex catalyst supply device 20 with a mixture of the auxiliary cocatalyst and the reaction raw material to polymerize isobutene into polybutene (a cationic polymerization reaction accompanied by generation of heat). In both cases, the auxiliary cocatalyst serves to control the activity of the complex catalyst, and also to easily control the molecular weight of polybutene when the polybutene is prepared. A reaction temperature, catalytic strength, and an isobutene content after reaction are adjusted at the reactor 50 to determine the molecular weights of products, the content of vinylidene, etc.

Meanwhile, a cascade occurs when polymerization is initiated, and polybutene is prepared when a termination reaction is completed. Here, the polymerization initiation is carried out when protons (H$^+$) in the cocatalyst/main catalyst complex catalyst bind to monomers of the reaction raw material. Circumstances in which polymerization is initiated may slightly vary according to a method of feeding the auxiliary cocatalyst. First, (i) a circumstance in which polymerization is initiated when the cocatalyst/main catalyst complex catalyst and the auxiliary cocatalyst come in contact at a line between the complex catalyst supply device 20 and the reactor 50 will be described with reference to Scheme 1 below.

[Scheme 1]

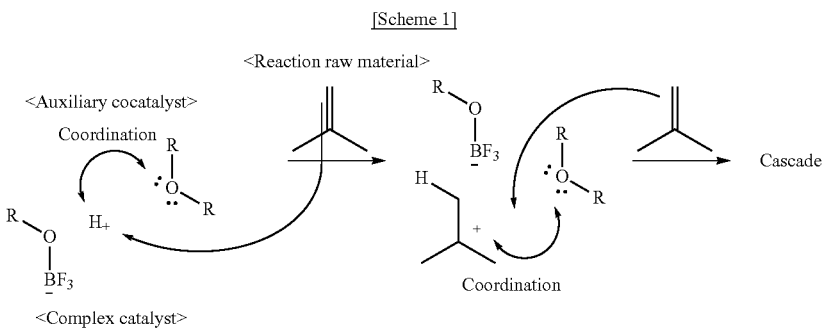

As shown in Scheme 1 above, the auxiliary cocatalyst is coordinated with protons in the complex catalyst to control catalytic strength of the complex catalyst. In addition, such a reaction is initiated when the monomers in the reaction raw material are protonated with the protons while imparting steric hindrance.

Next, (ii) a circumstance in which polymerization is initiated when the cocatalyst/main catalyst complex catalyst comes in contact with a mixture of the auxiliary cocatalyst and the reaction raw material at the reactor 50 will be described with reference to Scheme 2 below.

[Scheme 2]

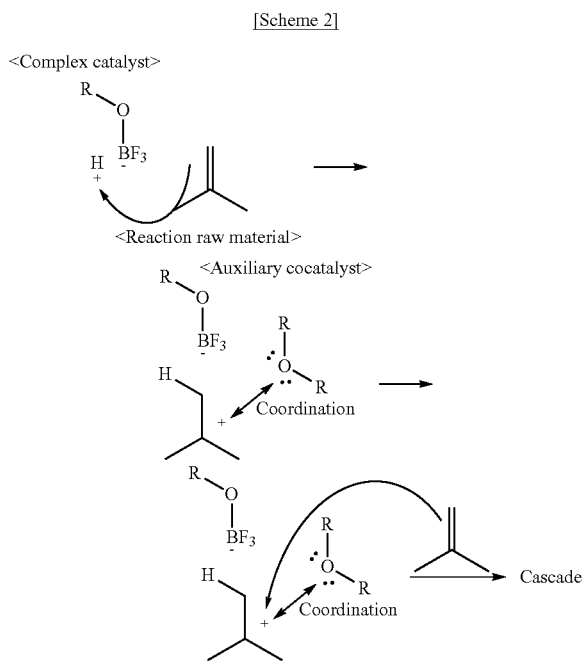

As shown in Scheme 2 above, such a reaction is initiated when the monomers in the reaction raw material are protonated with the protons, and the auxiliary cocatalyst is then coordinated with cations (cations observed when the protons bind to the reaction raw material) with which polymerization is initiated so as to control catalytic strength and impart steric hindrance. In both cases as described above, the auxiliary cocatalyst may control reactivity of the complex catalyst to adjust molecular weights of products, and also continuously impart steric hindrance to induce polymerization so that the reaction raw material is mainly used. As a result, the products may include a large amount of vinylidene when the reaction is terminated.

The in-line mixer 42 that may be further included when necessary serves to promote mixing of the auxiliary cocatalyst and the complex catalyst when the auxiliary cocatalyst is mixed with the complex catalyst at a line between the complex catalyst supply device 20 and the reactor 50. At the neutralization/washing tank 52, polymerization process water including water and a neutralizing agent (for example, sodium hydroxide), which is fed through a transfer line between the reactor 50 and the neutralization/washing tank 52, is added to the reaction product discharged from the reactor 50 to remove catalyst components from the reaction product and neutralize the reaction product, which is then discharged into the separation tank 54. The separation tank 54 serves to separate the reaction product into organic compounds and a water layer using the principle of phase separation into water and oil. Here, the organic compounds are discharged from the C4 distillation column 56, and a mixture of the water layer (or wastewater) including the catalyst components removed from the neutralization/washing tank 52 is completely discharged through a separate line. The C4 distillation column 56 serves to distil unreacted C-4 among the organic compounds fed from the separation tank 54 and discharge (or optionally collect) the distilled unreacted C-4. In this case, the residual organic compounds remaining after the unreacted C-4 is discharged are transferred to the LP distillation column 58. The LP distillation column 58 serves to distil LP among the residual organic compounds fed from the C4 distillation column 56 and discharge the distilled LP. In this case, the highly reactive polybutene remaining after the LP is discharged is stored in the product storage tank.

Subsequently, the method of preparing polybutene having an easily controllable molecular weight according to one embodiment of the present invention will be described with reference to FIG. 2. The method of preparing polybutene having an easily controllable molecular weight according to one embodiment of the present invention includes (a) preparing a complex catalyst including an alcohol compound as a cocatalyst and boron trifluoride as a main catalyst, (b) incorporating an ether compound as an auxiliary cocatalyst to the complex catalyst or a reaction raw material, and (c) reacting a mixture of the auxiliary cocatalyst and the complex catalyst with the reaction raw material when the auxiliary cocatalyst is incorporated to the complex catalyst in Step (b) and reacting the complex catalyst with a mixture of the auxiliary cocatalyst and the reaction raw material when the auxiliary cocatalyst is incorporated to the reaction raw material, thereby polymerizing isobutene into polybutene.

The method of preparing polybutene having an easily controllable molecular weight will be described in detail. First of all, an alcohol compound as the cocatalyst is fed to the complex catalyst preparation device 10 at a constant temperature, and boron trifluoride as the main catalyst is added thereto for a predetermined period of time to prepare a high-activity complex catalyst including the cocatalyst and the main catalyst. As the auxiliary cocatalyst, the ether compound may be mixed with the complex catalyst using two methods. The auxiliary cocatalyst may be mixed with the complex catalyst before polymerization reaction is initiated, that is, before the auxiliary cocatalyst enters the reactor 40, or may be mixed with the reaction raw material in the raw material injection line, and then mixed with the complex catalyst in the reactor 40. Thereafter, when a mixture of the auxiliary cocatalyst and the complex catalyst, in which the auxiliary cocatalyst is mixed with the complex catalyst before the auxiliary cocatalyst enters the reactor 40, is supplied to the reactor 40, the mixture of the auxiliary cocatalyst and the complex catalyst is allowed to react with the reaction raw material supplied to the reactor 40 via the raw material injection line to polymerize isobutene into polybutene. In addition, when a mixture of the auxiliary cocatalyst and the reaction raw material in which the auxiliary cocatalyst is mixed with the reaction raw material at the raw material injection line is supplied to the reactor 40, the mixture of the auxiliary cocatalyst and the reaction raw material is allowed to react with the complex catalyst supplied to the reactor 40 via the complex catalyst supply device 20 to polymerize isobutene into polybutene.

In preparation of the complex catalyst, a temperature at which the cocatalyst and the main catalyst are mixed may, for example, be in a range of −20 to −5° C., preferably −15 to −7° C., and more preferably −12 to −9° C., and the main catalyst may, for example, be added for 2 to 6 hours, preferably 3 to 5 hours, and more preferably 3.5 to 4.5 hours. The other characteristics and typical preparation conditions (temperature, pressure, etc.) of the highly reactive polybutene are as described above in the first embodiment.

Examples

Hereinafter, the present invention will be described in further detail with reference to specific embodiments thereof. Therefore, it should be understood that the description proposed herein is merely a preferable example for the purpose of illustration only, not intended to limit the scope of the invention. The following Examples 1 to 7 and Comparative Examples 1 to 6 are related to the first embodiment of the present invention, and the following Examples 8 to 14 and Comparative Examples 7 to 11 are related to the second embodiment of the present invention.

Example 1: Polymerization of Highly Reactive Polybutene Having a Molecular Weight of 450

A high-activity complex catalyst having an isopropanol/boron trifluoride molar ratio of 1.3 of Catalyst Preparation Example 1 listed in Table 1 below, and a low-activity complex catalyst having an isopropanol/boron trifluoride molar ratio of 2 of Catalyst Preparation Example 2 listed in Table 1 below, both of which were prepared in a complex catalyst preparation device, were discharged at the same time while a temperature in a reactor was maintained at −2° C., quantitatively mixed in a ratio of 11:89 so that a mixing molar ratio therebetween reached 1.9, and then passed through an in-line mixer. Thereafter, a raw material (C4-raffinate-1) having a composition as listed in Table 2 below was continuously injected to perform polymerization. A pressure in the reactor was set to at least 3 kg/cm$^2$ and an average retention time was set to 45 minutes so that the raw material was maintained in a liquid phase, and boron trifluoride was injected in a catalytic amount of 0.5 parts by weight, based on 100 parts by weight of isobutene. After the elapse of 180 minutes, a reaction product discharged from the reactor was mixed with 5% by weight of a caustic soda solution, and then transferred to a neutralization/washing tank to halt polymerization and remove the catalyst. Subsequently, wastewater including the removed catalyst was transferred to a separation tank, and discharged and removed from a lower end of the separation tank, and the reaction product was discharged from an upper portion of the separation tank, and fed into a C4 distillation column. Among the reaction product heated to 100° C., C4 was discharged from an upper portion of the C4 distillation column, and collected, and the other reaction product was discharged from a lower portion of the C4 distillation column, and then transferred to an LP distillation column. The transferred reaction product was heated at a temperature of 230° C. and a pressure of 25 torr for a retention time of 30 minutes to discharge LP from an upper portion of the LP distillation column and collect the LP, and a highly reactive polybutene was discharged from a lower portion of the LP distillation column, and then transferred to a product storage tank. A molecular weight of the resulting highly reactive polybutene was measured using gel permeation chromatography (GPC), and the vinylidene in the polybutene was analyzed using $C^{13}$-NMR. As a result, the highly reactive polybutene had an isobutene conversion rate of 90% and a vinylidene content of 88% ($M_n$ (number average molecular weight)=430, and Pd (polydispersity)=1.21).

TABLE 1

|  | Number of moles of cocatalyst per mole of boron trifluoride (IPA) |
|---|---|
| Catalyst Preparation Example 1 | 1.3 |
| Catalyst Preparation Example 2 | 2 |
| Catalyst Preparation Example 3 | 1.6 |
| Catalyst Preparation Example 4 | 1.9 |

TABLE 2

|  | Isobutane | n-Butane | 1-Butene | C-2-butene | T-2-butene | Isobutene |
|---|---|---|---|---|---|---|
| Content (% by weight) | 2.7 | 10 | 26.1 | 4.5 | 9.3 | 47.4 |

A high-activity complex catalyst having an isopropanol/boron trifluoride molar ratio of 1.3 of Catalyst Preparation Example 1 listed in Table 1 above, and a low-activity complex catalyst having an isopropanol/boron trifluoride molar ratio of 2 of Catalyst Preparation Example 2 listed in Table 1 above, both of which were prepared in the complex catalyst preparation device, were discharged at the same time while a temperature in the reactor was maintained at −12° C., quantitatively mixed in a ratio of 24:76 so that a mixing molar ratio therebetween reached 1.8, and then passed through an in-line mixer. Thereafter, a raw material (C4-raffinate-1) having a composition as listed in Table 2 above was continuously injected, and polymerization was performed in the same manner as in Example 1, except that a pressure in the reactor was set to at least 3 kg/cm$^2$ and an average retention time was set to 45 minutes so that the raw material was maintained in a liquid phase, and boron trifluoride was injected in a catalytic amount of 0.4 parts by weight, based on 100 parts by weight of the isobutene, thereby obtaining a polymerization product. The vinylidene in the polybutene was analyzed. As a result, the polybutene had an isobutene conversion rate of 90% and a vinylidene content of 88% ($M_n$=760, and Pd=1.25).

Example 3: Polymerization of Highly Reactive Polybutene Having a Molecular Weight of 1,000

A high-activity complex catalyst having an isopropanol/boron trifluoride molar ratio of 1.3 of Catalyst Preparation Example 1 listed in Table 1 above, and a low-activity complex catalyst having an isopropanol/boron trifluoride molar ratio of 2 of Catalyst Preparation Example 2 listed in Table 1 above, both of which were prepared in the complex catalyst preparation device, were discharged at the same time while a temperature in the reactor was maintained at −17° C., quantitatively mixed in a ratio of 37:63 so that a mixing molar ratio therebetween reached 1.7, and then passed through an in-line mixer. Thereafter, a raw material (C4-raffinate-1) having a composition as listed in Table 2 above was continuously injected, and polymerization was performed in the same manner as in Example 1, except that a pressure in the reactor was set to at least 3 kg/cm$^2$ and an average retention time was set to 45 minutes so that the raw material was maintained in a liquid phase, and boron trifluoride was injected in a catalytic amount of 0.33 parts by weight, based on 100 parts by weight of the isobutene, thereby obtaining a polymerization product. The vinylidene in the polybutene was analyzed. As a result, the polybutene had an isobutene conversion rate of 89% and a vinylidene content of 90% ($M_n$=970, and Pd=1.3).

Example 4: Polymerization of Highly Reactive Polybutene Having a Molecular Weight of 1,300

A high-activity complex catalyst having an isopropanol/boron trifluoride molar ratio of 1.3 of Catalyst Preparation Example 1 listed in Table 1 above, and a low-activity complex catalyst having an isopropanol/boron trifluoride molar ratio of 2 of Catalyst Preparation Example 2 listed in Table 1 above, both of which were prepared in the complex catalyst preparation device, were discharged at the same time while a temperature in the reactor was maintained at −24° C., quantitatively mixed in a ratio of 44:56 so that a mixing molar ratio therebetween reached 1.65, and then passed through an in-line mixer. Thereafter, a raw material (C4-raffinate-1) having a composition as listed in Table 2 above was continuously injected, and polymerization was performed in the same manner as in Example 1, except that a pressure in the reactor was set to at least 3 kg/cm$^2$ and an average retention time was set to 45 minutes so that the raw material was maintained in a liquid phase, and boron trifluoride was injected in a catalytic amount of 0.29 parts by weight, based on 100 parts by weight of the isobutene, thereby obtaining a polymerization product. The vinylidene in the polybutene was analyzed. As a result, the polybutene had an isobutene conversion rate of 89% and a vinylidene content of 89% ($M_n$=1,330, and Pd=1.52).

Example 5: Polymerization of Highly Reactive Polybutene Having a Molecular Weight of 1,550

A high-activity complex catalyst having an isopropanol/boron trifluoride molar ratio of 1.3 of Catalyst Preparation Example 1 listed in Table 1 above, and a low-activity complex catalyst having an isopropanol/boron trifluoride molar ratio of 2 of Catalyst Preparation Example 2 listed in Table 1 above, both of which were prepared in the complex catalyst preparation device, were discharged at the same time while a temperature in the reactor was maintained at −27° C., quantitatively mixed in a ratio of 47:53 so that a mixing molar ratio therebetween reached 1.63, and then passed through an in-line mixer. Thereafter, a raw material (C4-raffinate-1) having a composition as listed in Table 2 above was continuously injected, and polymerization was performed in the same manner as in Example 1, except that a pressure in the reactor was set to at least 3 kg/cm$^2$ and an average retention time was set to 45 minutes so that the raw material was maintained in a liquid phase, and boron trifluoride was injected in a catalytic amount of 0.27 parts by weight, based on 100 parts by weight of the isobutene, thereby obtaining a polymerization product. The vinylidene in the polybutene was analyzed. As a result, the polybutene had an isobutene conversion rate of 88% and a vinylidene content of 89% ($M_n$=1,570, and Pd=1.7).

Example 6 Polymerization of Highly Reactive Polybutene Having a Molecular Weight of 2,300

A high-activity complex catalyst having an isopropanol/boron trifluoride molar ratio of 1.3 of Catalyst Preparation Example 1 listed in Table 1 above, and a low-activity complex catalyst having an isopropanol/boron trifluoride molar ratio of 2 of Catalyst Preparation Example 2 listed in Table 1 above, both of which were prepared in the complex catalyst preparation device, were discharged at the same time while a temperature in the reactor was maintained at −30° C., quantitatively mixed in a ratio of 51:49 so that a mixing molar ratio therebetween reached 1.6, and then passed through an in-line mixer. Thereafter, a raw material (C4-raffinate-1) having a composition as listed in Table 2 above was continuously injected, and polymerization was performed in the same manner as in Example 1, except that a pressure in the reactor was set to at least 3 kg/cm$^2$ and an average retention time was set to 45 minutes so that the raw material was maintained in a liquid phase, and boron trifluoride was injected in a catalytic amount of 0.25 parts by weight, based on 100 parts by weight of the isobutene, thereby obtaining a polymerization product. The vinylidene in the polybutene was analyzed. As a result, the polybutene had an isobutene conversion rate of 87% and a vinylidene content of 88% ($M_n$=2,350, and Pd=1.83).

Example 7: Preparation of PIBSA Using Highly Reactive Polybutene Having a Molecular Weight of 750

250 g of the highly reactive polybutene prepared in Example 2, and 36 g (1.1 equivalents) of a maleic anhydride were input to a high-pressure reactor having a reactor bottom equipped with a nitrogen sparger, and air in the reactor was replaced with nitrogen. Thereafter, the resulting mixture was heated to 230° C. while a pressure in the reactor was maintained at 1.5 kgf/cm$^2$. After 4 hours, an upper pressure outlet of the reactor was opened so that a pressure in the reactor was reduced to atmospheric pressure. Nitrogen was injected through an upper nitrogen inlet coupled to the nitrogen sparger installed at the bottom of the reactor to remove an unreacted maleic anhydride for an hour. The reaction product in which the reaction was completed was measured using column chromatography. As a result, the highly reactive polybutene had a PIBSA conversion yield of 81%.

Comparative Example 1: Polymerization of Highly Reactive Polybutene Having a Molecular Weight of 450

A catalyst having an isopropanol/boron trifluoride molar ratio of 1.6 of Catalyst Preparation Example 3 listed in Table 1 above, which was prepared in the complex catalyst preparation device, was continuously injected together with a raw material (C4-raffinate-1) having a composition as listed in Table 2 above while a temperature in the reactor was maintained at 5° C. Thereafter, polymerization was performed in the same manner as in Example 1, except that a pressure in the reactor was set to at least 3 kg/cm$^2$ and an average retention time was set to 45 minutes so that the raw material was maintained in a liquid phase, and boron trifluoride was injected in a catalytic amount of 0.3 parts by weight, based on 100 parts by weight of the isobutene, thereby obtaining a polymerization product. The vinylidene in the polybutene was analyzed. As a result, the polybutene had an isobutene conversion rate of 90% and a vinylidene content of 77% ($M_n$=460, and Pd=1.24).

Comparative Example 2: Polymerization of Highly Reactive Polybutene Having a Molecular Weight of 750

A catalyst having an isopropanol/boron trifluoride molar ratio of 1.6 of Catalyst Preparation Example 3 listed in Table 1 above, which was prepared in the complex catalyst preparation device, was continuously injected together with a raw material (C4-raffinate-1) having a composition as listed in Table 2 above while a temperature in the reactor was maintained at −3° C. Thereafter, polymerization was performed in the same manner as in Example 1, except that a pressure in the reactor was set to at least 3 kg/cm$^2$ and an average retention time was set to 45 minutes so that the raw material was maintained in a liquid phase, and boron trifluoride was injected in a catalytic amount of 0.28 parts by weight, based on 100 parts by weight of the isobutene, thereby obtaining a polymerization product. The vinylidene in the polybutene was analyzed. As a result, the polybutene had an isobutene conversion rate of 90% and a vinylidene content of 79% ($M_n$=770, and Pd=1.27).

Comparative Example 3: Polymerization of Highly Reactive Polybutene Having a Molecular Weight of 1,000

A catalyst having an isopropanol/boron trifluoride molar ratio of 1.6 of Catalyst Preparation Example 3 listed in Table 1 above, which was prepared in the complex catalyst preparation device, was continuously injected together with a raw material (C4-raffinate-1) having a composition as listed in Table 2 above while a temperature in the reactor was maintained at −8° C. Thereafter, polymerization was performed in the same manner as in Example 1, except that a pressure in the reactor was set to at least 3 kg/cm$^2$ and an average retention time was set to 45 minutes so that the raw material was maintained in a liquid phase, and boron trifluoride was injected in a catalytic amount of 0.27 parts by weight, based on 100 parts by weight of the isobutene, thereby obtaining a polymerization product. The vinylidene in the polybutene was analyzed. As a result, the polybutene had an isobutene conversion rate of 89% and a vinylidene content of 80% ($M_n$=990, and Pd=1.34).

Comparative Example 4: Polymerization of Highly Reactive Polybutene Having a Molecular Weight of 750

A catalyst having an isopropanol/boron trifluoride molar ratio of 1.9 of Catalyst Preparation Example 4 listed in Table 1 above, which was prepared in the complex catalyst preparation device, was continuously injected together with a raw material (C4-raffinate-1) having a composition as listed in Table 2 above while a temperature in the reactor was maintained at −12° C. Thereafter, polymerization was performed in the same manner as in Example 1, except that a pressure in the reactor was set to at least 3 kg/cm² and an average retention time was set to 45 minutes so that the raw material was maintained in a liquid phase, and boron trifluoride was injected in a catalytic amount of 0.8 parts by weight, based on 100 parts by weight of the isobutene, thereby obtaining a polymerization product. The vinylidene in the polybutene was analyzed. As a result, the polybutene had an isobutene conversion rate of 56% and a vinylidene content of 89% ($M_n$=740, and Pd=1.22).

Comparative Example 5: Polymerization of Highly Reactive Polybutene Having a Molecular Weight of 1,000

A catalyst having an isopropanol/boron trifluoride molar ratio of 1.9 of Catalyst Preparation Example 4 listed in Table 1 above, which was prepared in the complex catalyst preparation device, was continuously injected together with a raw material (C4-raffinate-1) having a composition as listed in Table 2 above while a temperature in the reactor was maintained at −17° C. Thereafter, polymerization was performed in the same manner as in Example 1, except that a pressure in the reactor was set to at least 3 kg/cm² and an average retention time was set to 45 minutes so that the raw material was maintained in a liquid phase, and boron trifluoride was injected in a catalytic amount of 0.7 parts by weight, based on 100 parts by weight of the isobutene, thereby obtaining a polymerization product. The vinylidene in the polybutene was analyzed. As a result, the polybutene had an isobutene conversion rate of 60% and a vinylidene content of 90% ($M_n$=960, and Pd=1.31).

Comparative Example 6: Preparation of PIBSA Using Highly Reactive Polybutene Having a Molecular Weight of 750

250 g of the highly reactive polybutene prepared in Comparative Example 2, and 36 g (1.1 equivalents) of a maleic anhydride were input to a high-pressure reactor having a reactor bottom equipped with a nitrogen sparger, and air in the reactor was replaced with nitrogen. Thereafter, the resulting mixture was heated to 230° C. while a pressure in the reactor was maintained at 1.5 kgf/cm². After 4 hours, an upper pressure outlet of the reactor was opened so that a pressure in the reactor was reduced to atmospheric pressure. Nitrogen was injected through an upper nitrogen inlet coupled to the nitrogen sparger installed at the bottom of the reactor to remove an unreacted maleic anhydride for an hour. The reaction product in which the reaction was completed was measured using column chromatography. As a result, the highly reactive polybutene had a PIBSA conversion yield of 72%.

TABLE 3

| | Isobutene conversion rate (%) | Amount of catalyst used (% by weight) | Reaction temperature (° C.) | Vinylidene content (%) | $M_n$ (Pd) |
|---|---|---|---|---|---|
| Example 1 | 90 | 0.5 | −2 | 88 | 430 (1.21) |
| Example 2 | 90 | 0.4 | −12 | 88 | 760 (1.25) |

TABLE 3-continued

| | Isobutene conversion rate (%) | Amount of catalyst used (% by weight) | Reaction temperature (° C.) | Vinylidene content (%) | $M_n$ (Pd) |
|---|---|---|---|---|---|
| Example 3 | 89 | 0.33 | −17 | 90 | 970 (1.3) |
| Example 4 | 89 | 0.29 | −24 | 89 | 1,330 (1.52) |
| Example 5 | 88 | 0.27 | −27 | 89 | 1,570 (1.7) |
| Example 6 | 87 | 0.25 | −30 | 88 | 2,350 (1.83) |
| Comparative Example 1 | 90 | 0.3 | 5 | 77 | 460 (1.24) |
| Comparative Example 2 | 90 | 0.28 | −3 | 79 | 770 (1.27) |
| Comparative Example 3 | 89 | 0.27 | −8 | 80 | 990 (1.34) |
| Comparative Example 4 | 56 | 0.8 | −12 | 89 | 740 (1.22) |
| Comparative Example 5 | 60 | 0.7 | −17 | 90 | 960 (1.31) |

TABLE 4

| | PIBSA conversion yield (%) |
|---|---|
| Example 7 | 81 |
| Comparative Example 6 | 72 |

The catalyst having an isopropanol/boron trifluoride molar ratio of 1.6 of Catalyst Preparation Example 3 listed in Table 1 above was suitable for production of products having a molecular weight of 2,300. Therefore, the catalyst was used to polymerize products having a higher content of vinylidene, and also used to polymerize products having a molecular weight of 1,300 and 1,550, but was not used to produce products having a low content of vinylidene. It could be seen that the products were prepared with an extremely low content of vinylidene were prepared when the products having a lower molecular weight than the products having a molecular weight of 1,300 were polymerized (Comparative Examples 1 to 3 listed in Table 3). The catalyst having an isopropanol/boron trifluoride molar ratio of 1.9 of Catalyst Preparation Example 4 listed in Table 1 above was suitable for production of products having a molecular weight of 450. Therefore, the catalyst was used to polymerize products having a high isobutene conversion rate, and also used to polymerize products having a low molecular weight of 750 and 1,000. However, it was inefficient in that the products having a low molecular weight of 750 and 1,000 were produced to have a low isobutene conversion rate (Comparative Examples 4 and 5 listed in Table 3). Products having a higher molecular weight than 1,000 were not prepared, and thus excluded in Comparative Examples. Generally, when the products having a high molecular weight were produced with the high-activity complex catalyst, and the products having a low molecular weight were produced with the low-activity complex catalyst in consideration of both production yield and quality, the highly reactive polybutenes having excellent qualities were effectively prepared. That is, no polymer products were produced with the low-activity complex catalyst, and the products having a low molecular weight (i.e., a molecular weight of 750 and 1,000), which was close to those of the polymer products, were produced with low production efficiency. When low-molecular-weight products were polymerized with the high-activity complex catalyst, the products were produced to have an extremely low content of vinylidene. As a result, it could be seen that production efficiency or quality (vinylidene content) were degraded when the products having a high molecular weight (i.e., a molecular weight of 1,300 and 1,550), which was close to those of the polymer products, other than the products having proper molecular weights were prepared. Accordingly, it could be seen that there was a great difference in the values which the end users could acquire or the values which the manufacturers of highly reactive polybutene could provide to consumers when the PIBSA yield of the highly reactive polybutene of Example 2 prepared with the optimum complex catalyst listed in Table 4 was compared with that of the highly reactive polybutene of Comparative Example 2 prepared with the complex catalyst which was not optimal.

Example 8: Polymerization of Highly Reactive Polybutene Having a Molecular Weight of 450

A complex catalyst having an isopropanol (cocatalyst)/boron trifluoride (main catalyst) molar ratio of 1.05 of Preparation Example 1 listed in Table 5 below was prepared, and diisopropyl ether as an auxiliary cocatalyst was incorporated to the complex catalyst, quantitatively mixed so that a molar ratio of the cocatalyst and auxiliary cocatalyst and the main catalyst reached 1.9, and then supplied to a reactor. Thereafter, a reaction raw material (C4-raffinate-1) having a composition listed in Table 6 below was also fed to the reactor, and polymerization was then performed. A reaction temperature and a pressure in the reactor were set to −1° C. and at least 3 kg/cm², respectively, and an average retention time was set to 45 minutes so that the raw material was maintained in a liquid phase, and the catalyst was injected in an amount of 0.48 parts by weight, based on 100 parts by weight of the isobutene. After the elapse of 180 minutes, a reaction product discharged from the reactor was mixed with 5% by weight of a caustic soda solution, and then transferred to a neutralization/washing tank to remove the catalyst. Subsequently, wastewater including the catalyst was transferred to a separation tank, discharged, and removed, and the residual reaction product was fed into a C4 distillation column. The reaction product was heated to 100° C. to discharge and collect C4 from the C4 distillation column, and the other reaction product was transferred to an LP distillation column. The reaction product transferred to the LP distillation column was heated at a temperature of 230° C. and a pressure of 25 torr for a retention time of 30 minutes to discharge and collect LP in the reaction product, and residual reaction product, that is, highly reactive polybutene was transferred to and stored in a product storage tank. A molecular weight of the prepared highly reactive polybutene was measured using gel permeation chromatography (GPC), and the vinylidene in the polybutene was analyzed using $C^{13}$-NMR. As a result, the highly reactive polybutene had an isobutene conversion rate of 90% and a vinylidene content of 89% ($M_n$ (number average molecular weight)=440, and Pd (polydispersity)=1.17).

TABLE 5

| | Complex catalyst (cocatalyst/main catalyst) | Molar ratio |
|---|---|---|
| Preparation Example 1 | Isopropanol/boron trifluoride | 1.05 |
| Preparation Example 2 | Isopropanol/boron trifluoride | 1.55 |

TABLE 5-continued

| | Complex catalyst (cocatalyst/main catalyst) | Molar ratio |
|---|---|---|
| Preparation Example 3 | Isopropanol/boron trifluoride | 1.9 |

TABLE 6

| | Isobutane | n-Butane | 1-Butene | C-2-butene | T-2-butene | Isobutene |
|---|---|---|---|---|---|---|
| Content (% by weight) | 2.5 | 10 | 26 | 4.6 | 9.1 | 47.8 |

Example 9: Polymerization of Highly Reactive Polybutene Having a Molecular Weight of 750

Polymerization was performed in the same manner as in Example 8 to prepare a polymerization product, except that a catalyst having an isopropanol and diisopropyl ether/boron trifluoride molar ratio of 1.8 was used, the reaction temperature was maintained at −13° C., and the catalyst was injected in an amount of 0.37 parts by weight, based on 100 parts by weight of the isobutene. The vinylidene in the polybutene was analyzed. As a result, the polybutene had an isobutene conversion rate of 90% and a vinylidene content of 90% ($M_n$=750, and Pd=1.23).

Example 10: Polymerization of Highly Reactive Polybutene Having a Molecular Weight of 1,000

Polymerization was performed in the same manner as in Example 8 to prepare a polymerization product, except that a catalyst having an isopropanol and diisopropyl ether/boron trifluoride molar ratio of 1.7 was used, the reaction temperature was maintained at −19° C., and the catalyst was injected in an amount of 0.3 parts by weight, based on 100 parts by weight of the isobutene. The vinylidene in the polybutene was analyzed. As a result, the polybutene had an isobutene conversion rate of 91% and a vinylidene content of 90% ($M_n$=990, and Pd=1.31).

Example 11: Polymerization of Highly Reactive Polybutene Having a Molecular Weight of 1,300

Polymerization was performed in the same manner as in Example 8 to prepare a polymerization product, except that a catalyst having an isopropanol and diisopropyl ether/boron trifluoride molar ratio of 1.65 was used, the reaction temperature was maintained at −24° C., and the catalyst was injected in an amount of 0.28 parts by weight, based on 100 parts by weight of the isobutene. The vinylidene in the polybutene was analyzed. As a result, the polybutene had an isobutene conversion rate of 89% and a vinylidene content of 91% ($M_n$=1,350, and Pd=1.5).

Example 12: Polymerization of Highly Reactive Polybutene Having a Molecular Weight of 1,550

Polymerization was performed in the same manner as in Example 8 to prepare a polymerization product, except that a catalyst having an isopropanol and diisopropyl ether/boron trifluoride molar ratio of 1.63 was used, the reaction temperature was maintained at −27° C., and the catalyst was injected in an amount of 0.25 parts by weight, based on 100 parts by weight of the isobutene. The vinylidene in the polybutene was analyzed. As a result, the polybutene had an isobutene conversion rate of 89% and a vinylidene content of 90% ($M_n$=1,540, and Pd=1.68).

Example 13: Polymerization of Highly Reactive Polybutene Having a Molecular Weight of 2,300

Polymerization was performed in the same manner as in Example 8 to prepare a polymerization product, except that a catalyst having an isopropanol and diisopropyl ether/boron trifluoride molar ratio of 1.55 was used, the reaction temperature was maintained at −30° C., and the catalyst was injected in an amount of 0.22 parts by weight, based on 100 parts by weight of the isobutene. The vinylidene in the polybutene was analyzed. As a result, the polybutene had an isobutene conversion rate of 87% and a vinylidene content of 90% ($M_n$=2,410, and Pd=1.81).

Example 14: Preparation of PIBSA Using Highly Reactive Polybutene Having a Molecular Weight of 1,000

250 g of the highly reactive polybutene prepared in Example 10, and 27 g (1.1 equivalents) of a maleic anhydride were input to a high-pressure reactor having a reactor bottom equipped with a nitrogen sparger, and air in the reactor was replaced with nitrogen. Thereafter, the resulting mixture was heated to 230° C. while a pressure in the reactor was maintained at 1.5 kgf/cm². After 4 hours, a pressure outlet of the reactor was opened so that a pressure in the reactor was reduced to atmospheric pressure. Then, nitrogen was injected through a nitrogen inlet coupled to the nitrogen sparger to remove an unreacted maleic anhydride for an hour. The reaction product in which the reaction was completed was measured using column chromatography. As a result, the highly reactive polybutene had a PIBSA conversion yield of 82%.

Comparative Example 7: Polymerization of Highly Reactive Polybutene Having a Molecular Weight of 1,000

Polymerization was performed in the same manner as in Example 8 to prepare a polymerization product, except that a complex catalyst having an isopropanol (cocatalyst)/boron trifluoride (main catalyst) molar ratio of 1.9 of Preparation Example 3 listed in Table 5 above was prepared for use, the auxiliary cocatalyst was not used, the reaction temperature was maintained at −8° C., and the catalyst was injected in an amount of 0.24 parts by weight, based on 100 parts by weight of the isobutene. The vinylidene in the polybutene was analyzed. As a result, the polybutene had an isobutene conversion rate of 90% and a vinylidene content of 77% ($M_n$=980, and Pd=1.3).

Comparative Example 8: Polymerization of Highly Reactive Polybutene Having a Molecular Weight of 2,300

Polymerization was performed in the same manner as in Example 8 to prepare a polymerization product, except that a complex catalyst having an isopropanol (cocatalyst)/boron trifluoride (main catalyst) molar ratio of 1.55 of Preparation Example 2 listed in Table 5 above was prepared for use, the auxiliary cocatalyst was not used, the reaction temperature was maintained at −30° C., and the catalyst was injected in an amount of 0.22 parts by weight, based on 100 parts by weight of the isobutene. The vinylidene in the polybutene was analyzed. As a result, the polybutene had an isobutene conversion rate of 90% and a vinylidene content of 86% ($M_n$=2,370, and Pd=1.84).

Comparative Example 9: Polymerization of Highly Reactive Polybutene Having a Molecular Weight of 450

Polymerization was performed in the same manner as in Example 8 to prepare a polymerization product, except that a complex catalyst having an isopropanol (cocatalyst)/boron trifluoride (main catalyst) molar ratio of 1.9 of Preparation Example 3 listed in Table 5 above was prepared for use, the auxiliary cocatalyst was not used, the reaction temperature was maintained at −1° C., and the catalyst was injected in an amount of 0.49 parts by weight, based on 100 parts by weight of the isobutene. The vinylidene in the polybutene was analyzed. As a result, the polybutene had an isobutene conversion rate of 90% and a vinylidene content of 87% ($M_n$=440, and Pd=1.21).

Comparative Example 10: Polymerization of Highly Reactive Polybutene Having a Molecular Weight of 1,000

Polymerization was performed in the same manner as in Example 8 to prepare a polymerization product, except that a complex catalyst having an isopropanol (cocatalyst)/boron trifluoride (main catalyst) molar ratio of 1.9 of Preparation Example 3 listed in Table 5 above was prepared for use, the auxiliary cocatalyst was not used, the reaction temperature was maintained at −19° C., and the catalyst was injected in an amount of 0.7 parts by weight, based on 100 parts by weight of the isobutene. The vinylidene in the polybutene was analyzed. As a result, the polybutene had an isobutene conversion rate of 60% and a vinylidene content of 90% ($M_n$=960, and Pd=1.31).

Comparative Example 11: Preparation of PIBSA Using Highly Reactive Polybutene Having a Molecular Weight of 1,000

250 g of the highly reactive polybutene prepared in Comparative Example 10, and 27 g (1.1 equivalents) of a maleic anhydride were input to a high-pressure reactor having a reactor bottom equipped with a nitrogen sparger, and air in the reactor was replaced with nitrogen. Thereafter, the resulting mixture was heated to 230° C. while a pressure in the reactor was maintained at 1.5 kgf/cm². After 4 hours, a pressure outlet of the reactor was opened so that a pressure in the reactor was reduced to atmospheric pressure. Then, nitrogen was injected through a nitrogen inlet coupled to the nitrogen sparger to remove an unreacted maleic anhydride for an hour. The reaction product in which the reaction was completed was measured using column chromatography. As a result, the highly reactive polybutene had a PIBSA conversion yield of 72%.

Physical properties and reaction conditions of the polybutenes prepared in Examples 8 to 13 and Comparative Examples 7 to 10 are summarized in Table 7 below. In addition, the PIBSA conversion yields in which the highly reactive polybutenes were converted to PIBSAs in Example 14 and Comparative Example 11 are listed in Table 8 below.

TABLE 7

| | Isobutene conversion rate (%) | Amount of catalyst used (% by weight) | Reaction temperature (° C.) | Vinylidene content (%) | $M_n$ (Pd) |
|---|---|---|---|---|---|
| Example 8 | 90 | 0.48 | −1 | 89 | 440 (1.17) |
| Example 9 | 90 | 0.37 | −13 | 90 | 750 (1.23) |
| Example 10 | 91 | 0.3 | −19 | 90 | 990 (1.31) |
| Example 11 | 89 | 0.28 | −24 | 91 | 1,350 (1.5) |
| Example 12 | 89 | 0.25 | −27 | 90 | 1,540 (1.68) |
| Example 13 | 87 | 0.22 | −30 | 90 | 2,410 (1.81) |
| Comparative Example 7 | 90 | 0.24 | −8 | 77 | 980 (1.3) |
| Comparative Example 8 | 90 | 0.22 | −30 | 86 | 2,370 (1.84) |
| Comparative Example 9 | 90 | 0.49 | −1 | 87 | 440 (1.21) |
| Comparative Example 10 | 60 | 0.7 | −19 | 90 | 960 (1.31) |

TABLE 8

| | PIBSA conversion yield (%) |
|---|---|
| Example 14 | 82 |
| Comparative Example 11 | 72 |

As listed in Table 7, the complex catalyst having an isopropanol (cocatalyst)/boron trifluoride (main catalyst) molar ratio of 1.55 of Preparation Example 2 listed in Table 5 was suitable for production of products (or highly reactive polybutenes) having a molecular weight of 2,300 (Comparative Example 8), and thus was used to polymerize products having a high content of vinylidene. The complex catalyst of Preparation Example 2 listed in Table 5 was used to polymerize products having a molecular weight of less than 2,300 (for example, products having a molecular weight of 1,300 and 1,550). In this case, the products were produced to have a low content of vinylidene. In particular, it could be seen that the products having an extremely low content of vinylidene were prepared when the products had a molecular weight of 1,300 or less, as described in Comparative Example 7. In addition, it could be seen that the content of vinylidene in the products having a molecular weight of 2,300 prepared to have a high content of vinylidene (Comparative Example 2) was also lower by approximately 4%, compared to those of the products prepared in Example 13 (having a molecular weight of 2,300).

The complex catalyst having an isopropanol (cocatalyst)/boron trifluoride (main catalyst) molar ratio of 1.9 of Preparation Example 3 listed in Table 5 was suitable for production of products having a molecular weight of 450 (Comparative Example 9), and thus was used to polymerize products having a high content of vinylidene. The complex catalyst of Preparation Example 3 listed in Table 5 was used to polymerize products having a molecular weight of greater than 450 (for example, products having a molecular weight of 750 and 1,000), but production of the products was inefficient since the products were prepared with a low isobutene conversion rate, as shown in Comparative Example 10 (having a molecular weight of 1,000). In addition, it could be seen that the content of vinylidene in the products having a molecular weight of 450 prepared to have a high content of vinylidene (Comparative Example 9) were also lower by approximately 2%, compared to those of the products (having a molecular weight of 450) prepared in Example 8. Meanwhile, when the complex catalyst of Preparation Example 3 listed in Table 5 was used, products having a higher molecular weight than 1,000 were not prepared, and thus excluded in Comparative Examples.

That is, when the low-activity complex catalyst (i.e., a complex catalyst of Preparation Example 3 listed in Table 5) was used, it was impossible to prepare a polymer products (i.e., products having a molecular weight of 1,000 or more). Additionally, it could be seen that production efficiency was degraded even when the products having a low molecular weight (i.e., a molecular weight of 750 and 1,000), which was close to those of the polymer products, and that the products were produced with an extremely low content of vinylidene when the high-activity complex catalyst (i.e., a complex catalyst of Preparation Example 2 listed in Table 5) was used to polymerize the product having a lower molecular weight (products having a molecular weight of 1,300 or less), and production efficiency or quality (vinylidene content) was degraded even when the products having a high molecular weight (i.e., a molecular weight of 1,300 and 1,550) closed to the polymer products.

In addition, it could be seen that the yields differed by approximately 10% when the highly reactive polybutene of Example 10 of the present invention and the highly reactive polybutene of Comparative Example 10 were converted into PIBSAs, as listed in Table 8. Accordingly, it could be seen that the values which the end users could acquire or the values which the manufacturers could provide to consumers differed by a difference in the yield of PIBSA.

As described above, according to the method of preparing polybutene having an easily controllable molecular weight according to the embodiments of the present invention, which includes forming a cocatalyst/main catalyst complex catalyst and further adding an auxiliary cocatalyst to control the catalytic strength in a polymerization reaction and impart steric hindrance, it was confirmed that the products having various molecular weights continued to be easily prepared, and production yield and quality of the prepared highly reactive polybutene products were also improved.

The invention claimed is:

1. An apparatus for preparing polybutene comprising:
 a complex catalyst preparation device for preparing a high-activity complex catalyst and low-activity complex catalyst to form highly reactive polybutene through polymerization;
 a high-molar ratio complex catalyst system for controlling storage and supply of the high-activity complex catalyst;
 a low-molar ratio complex catalyst system for controlling storage and supply of the low-activity complex catalyst; and
 a reactor for reacting the high-activity complex catalyst, the low-activity complex catalyst, and a reaction raw material comprising isobutene to polymerize isobutene into a highly reactive polybutene;
 wherein a cocatalyst/main catalyst molar ratio of the low-activity complex catalyst wherein the cocatalyst/main catalyst molar ratio is high is greater than a cocatalyst/main catalyst molar ratio of the high-activity complex catalyst wherein the cocatalyst/main catalyst molar ratio is low.

2. The apparatus according to claim 1, further comprising an in-line mixer for mixing the high-activity complex catalyst and the low-activity complex catalyst to form the highly reactive polybutene through polymerization.

3. The apparatus according to claim 1, wherein the complex catalyst forming the highly reactive polybutene through polymerization comprises the high-activity complex catalyst having a low cocatalyst/main catalyst molar ratio, and the low-activity complex catalyst having a high cocatalyst/main catalyst molar ratio.

4. The apparatus according to claim 3, wherein the cocatalyst/main catalyst molar ratio of the high-activity complex catalyst having a low cocatalyst/main catalyst molar ratio is greater than or equal to 1 and less than 1.5, and the cocatalyst/main catalyst molar ratio of the low-activity complex catalyst having a high cocatalyst/main catalyst molar ratio is in a range of 1.5 to 3.

5. The apparatus according to claim 1, wherein the highly reactive polybutene has a vinylidene content of at least 70% at one end of a molecule thereof.

6. The apparatus according to claim 1, wherein the catalyst supplied through the complex catalyst preparation device comprises a main catalyst, a cocatalyst comprising water or an alcohol compound, and an auxiliary cocatalyst comprising an alkyl ether.

7. The apparatus according to claim 6, wherein the main catalyst is a Lewis acid selected from the group consisting of boron trifluoride, boron trichloride, aluminum trichloride, and zinc chloride.

8. The apparatus according to claim 7, wherein the boron trifluoride is fed at a rate to achieve a content of the boron trifluoride is in a range of 0.1 to 1.0 parts by weight, based on 100 parts by weight of the isobutene.

9. The apparatus according to claim 6, wherein the alcohol compound is selected from the group consisting of methanol, ethanol, propanol, isopropyl alcohol (isopropanol), butanol, and isobutanol, and the alkyl ether is selected from the group consisting of dimethyl ether, diethyl ether, dipropyl ether, isopropyl sec-butyl ether, sec-butyl ether, isoamyl ether, isopropyl isoamyl ether, and sec-butyl isoamyl ether.

10. A method of preparing polybutene, comprising:
preparing a high-activity complex catalyst and a low-activity complex catalyst to form highly reactive polybutene through polymerization;
controlling storage and supply of the high-activity complex catalyst and the low-activity complex catalyst; and
supplying the high-activity complex catalyst, the low-activity complex catalyst, and a reaction raw material comprising isobutene to polymerize isobutene into a highly reactive polybutene
wherein a cocatalyst/main catalyst molar ratio of the low-activity complex catalyst wherein the cocatalyst/main catalyst molar ratio is high is greater than a cocatalyst/main catalyst molar ratio of the high-activity complex catalyst wherein the cocatalyst/main catalyst molar ratio is low.

11. The method according to claim 10, further comprising mixing the high-activity complex catalyst and the low-activity complex catalyst to form the highly reactive polybutene through polymerization.

12. The method according to claim 10, wherein the highly reactive polybutene is polymerized at a temperature of −40 to 20° C. and a pressure of 3 kg/cm2 or more for a retention time of 5 to 100 minutes.

* * * * *